United States Patent [19]

Haaf et al.

[11] 4,097,550

[45] Jun. 27, 1978

[54] COMPOSITION OF A RADIAL TELEBLOCK COPOLYMER AND A COPOLYMER OF A VINYL AROMATIC COMPOUND AND AN α,β UNSATURATED CYCLIC ANHYDRIDE

[75] Inventors: William Robert Haaf, Voorhesville; Gim Fun Lee, Jr., Albany, both of N.Y.

[73] Assignee: General Electric Company, Pittsfield, Mass.

[21] Appl. No.: 693,895

[22] Filed: Jun. 8, 1976

[51] Int. Cl.² ............... C08L 51/00; C08L 53/00
[52] U.S. Cl. ............... 260/876 B; 260/42.18; 260/47 ET; 260/824 R; 260/828; 260/887; 260/890; 260/892; 260/893; 260/898; 260/899; 260/901
[58] Field of Search ........ 260/876 R, 876 B, 42.18, 260/892–893, 890, 47 ET, 877, 887, 898, 899, 901, 836

[56] References Cited

U.S. PATENT DOCUMENTS

| | | | |
|---|---|---|---|
| 2,914,505 | 11/1959 | Roper et al. | 260/890 X |
| 3,281,383 | 10/1966 | Zelinski et al. | 260/879 X |
| 3,639,508 | 2/1972 | Kambour | 260/876 R |
| 3,641,212 | 2/1972 | Narayana et al. | 260/893 |
| 3,660,531 | 5/1972 | Lauchlan et al. | 260/876 B |
| 3,689,596 | 9/1972 | Narayana et al. | 260/876 B |
| 3,753,936 | 8/1973 | Marrs | 260/876 B X |
| 3,833,687 | 9/1974 | Lee | 260/876 R |
| 3,835,200 | 9/1974 | Lee | 260/876 B |
| 3,943,191 | 3/1976 | Cooper et al. | 260/876 R |
| 3,959,211 | 5/1976 | Cooper et al. | 260/42.18 |
| 3,960,808 | 6/1976 | Katchman | 260/42.18 |

OTHER PUBLICATIONS

Haws et al., in Rubber World, Jan. 1973, pp. 27–32.
Marrs et al., in Adhesives Age, Dec. 1971, pp. 15–20.

*Primary Examiner*—Thomas De Benedictis
*Attorney, Agent, or Firm*—Morgan, Finnegan, Pine, Foley & Lee

[57] ABSTRACT

Thermoplastic molding compositions are disclosed which comprise an intimate admixture of (i) a copolymer of a vinyl aromatic compound and an α,β-unsaturated cyclic anhydride, including rubber-modified copolymers thereof, and (ii) a radial teleblock copolymer comprising a vinyl aromatic compound, a conjugated diene and a coupling agent. Optionally, the composition can also include a polyphenylene ether resin.

13 Claims, No Drawings

COMPOSITION OF A RADIAL TELEBLOCK COPOLYMER AND A COPOLYMER OF A VINYL AROMATIC COMPOUND AND AN α,β UNSATURATED CYCLIC ANHYDRIDE

The present invention relates to thermoplastic molding compositions which are based on an intimate admixture of a copolymer of a vinyl aromatic compound and an α,β-unsaturated cyclic anhydride and a radial teleblock copolymer of a vinyl aromatic compound, a conjugated diene and a coupling agent, with or without a polyphenylene ether resin present. The compositions of this invention provide molded articles having good overall mechanical properties, e.g., impact strength, tensile strength, tensile elongation, and the like.

BACKGROUND OF THE INVENTION

Vinyl aromatic resins, e.g., polystyrene, have been found to be useful in thermoplastic molding compositions. Vinyl aromatic resins have poor heat distortion and impact resistance, however, and attempts have been made to upgrade these properties. One approach has been to modify the vinyl aromatic resins by copolymerizing these materials with α,β-unsaturated cyclic anhydrides, to form copolymers such as poly(styrene-maleic anhydride). Although improvements in heat resistance and solvent resistance are provided, the resulting copolymers are somewhat brittle, and do not have good resistance to impact.

Various attempts have been made to improve the impact resistance of copolymers of vinyl aromatic resins and α,β-unsaturated cyclic anhydrides. For instance, these copolymers have been blended with nitrile rubbers. Blends of nitrile rubber and styrene-maleic anhydride copolymers are disclosed in U.S. Pat. Nos. 2,914,505 and 3,641,212. With some of these compositions, however, the components are not compatible, and the compositions are difficult to prepare.

It has now been surprisingly discovered that copolymers of a vinyl aromatic compound and an α,β-unsaturated cyclic anhydride can be combined with a radial teleblock copolymer of a vinyl aromatic compound and a conjugated diene, e.g., a styrenebutadiene radial teleblock copolymer, to form compositions which can be molded to articles having good mechanical properties, including good impact strength, tensile yield and elongation.

As used herein, the term "radial teleblock copolymer" refers to branched polymers having segments, or blocks, which are comprised of a conjugated diene polymer, blocks of a vinyl aromatic polymer, and a coupling agent. More particularly, in the copolymer structure, several chains of the diene polymer, usually three or more, extend from a coupling agent, with each chain terminating at its other end with a block of the vinyl aromatic polymer. It is generally believed that incompatibility of the block segments in the radial teleblock copolymer promotes the formation of a two-phase system with blocks of the vinyl aromatic polymer coalescing to form discrete regions, or "domains". These domains simulate the effect of cross-links between the chains of elastomer, and a branched elastomeric network is thus formed comprising blocks of a conjugated diene polymer, blocks of vinyl aromatic polymer, and a coupling agent.

Radial teleblock copolymers are known in the art. For instance, detailed descriptions of these materials are given by Marrs et al in ADHESIVES AGE, December, 1971, pp. 15–20 and by Haws et al in RUBBER WORLD, January, 1973, pp. 27–32, the disclosures of which are incorporated by reference.

SUMMARY OF THE INVENTION

The present invention provides, in its broadest aspects, a thermoplastic composition which comprises an intimate admixture of:

(i) a copolymer of a vinyl aromatic compound and an α,β-unsaturated cyclic anhydride; and (ii) a radial teleblock copolymer of a vinyl aromatic compound, a conjugated diene and a coupling agent.

In a preferred embodiment, the compositions of this invention further comprise a polyphenylene ether resin.

DETAILED DESCRIPTION OF THE INVENTION

The copolymers of a vinyl aromatic compound and an α,β-unsaturated cyclic anhydride (i) are well known in the art and are described in the literature. In general, they are prepared by conventional bulk solution or emulsion techniques using free-radical initiation. For example, styrene-maleic anhydride copolymers can be obtained by simply reacting the two monomers, i.e., styrene and maleic anhydride, at 50° C in the presence of benzoyl peroxide. The rate of polymerization may be better controlled if a solvent such as acetone, benzene or xylene is used.

The vinyl aromatic compound of component (i) can be derived from compounds of the formula:

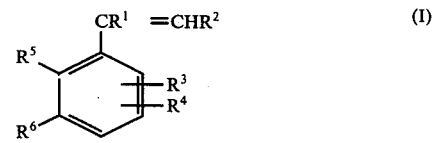

wherein $R^1$ and $R^2$ are selected from the group consisting of (lower) alkyl or alkenyl groups of from 1 to 6 carbon atoms and hydrogen; $R^3$ and $R^4$ are selected from the group consisting of chloro, bromo, hydrogen and (lower) alkyl of from 1 to 6 carbon atoms; $R^5$ and $R^6$ are selected from the group consisting of hydrogen and (lower) alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound.

The α,β-unsaturated cyclic anhydride of component (i) can be represented by the formula:

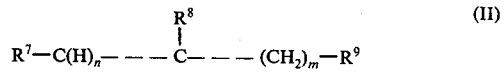

wherein the dotted lines represent a single or a double carbon to carbon bond, $R^7$ and $R^8$ taken together represents a

linkage, $R^9$ is selected from the group consisting of hydrogen, vinyl, alkyl, alkenyl, alkylcarboxylic or alkenylcarboxylic of from 1 to 12 carbon atoms, $n$ is 1 or 2, depending on the position of the carbon-carbon double bond, and m is an integer of from 0 to about 10. Examples include maleic anhydride, citraconic anhydride, itaconic anhydride, aconitic anhydride, and the like.

The preparation of these copolymers is described in U.S. Pat. Nos. 2,971,939; 3,336,267 and 2,769,804, the disclosures of which are incorporated herein by reference.

The copolymers which comprise component (i) include rubber-modified copolymers thereof. The rubber employed in preparing the rubber-modified copolymers of a vinyl aromatic compound and an $\alpha,\beta$-unsaturated cyclic anhydride can be a polybutadiene rubber, butyl rubber, styrene-butadiene rubber, acrylonitrile rubber, ethylene-propylene copolymers, natural rubber, EPDM rubbers and the like.

The preparation of rubber-modified copolymers of a vinyl aromatic compound and an $\alpha,\beta$-unsaturated cyclic anhydride is described in Netherlands Pat. No. 7,212,714, which is incorporated herein by reference.

Component (i) can comprise from 40 to 1 parts by weight of the $\alpha,\beta$-unsaturated cyclic anhydride, from 60 to 99 parts by weight of a vinyl aromatic compound and from 0 to 25 parts by weight of rubber. The preferred polymers will contain about 25-5 parts by weight of the $\alpha,\beta$-unsaturated cyclic anhydride, 75-95 parts by weight of the vinyl aromatic compound, and 10 parts by weight of rubber.

A preferred unmodified vinyl aromatic-$\alpha,\beta$-unsaturated cyclic anhydride copolymer useful in the composition of this invention is Dylark 232, commercially available from Arco Polymers. Dylark 232 is a styrene-maleic anhydride copolymer containing about 11% maleic anhydride, the balance being styrene. A preferred rubber-modified vinyl aromatic-$\alpha,\beta$-unsaturated cyclic anhydride copolymer is Dylark 240, which is also available from Arco Polymers. Dylark 240 is a high impact styrene-maleic anhydride copolymer containing 9-10% rubber and 9% maleic anhydride, the balance being styrene.

The radial teleblock copolymers (ii) are available commercially or can be prepared by following the teachings of the prior art. As an illustration, they can be made by polymerizing conjugated dienes, e.g., butadiene, and vinyl aromatic compounds, e.g., styrene in the presence of an organometallic initiator, e.g., n-butyllithium, to produce copolymers which contain an active metal atom, such as lithium, on one end of each of the polymer chains. These metal atom-terminated polymers are then reacted with a coupling agent which has at least three active sites capable of reacting with the carbon-metal atom bonds on the polymer chains and replacing the metal atoms on the chains. This results in polymers which have relatively long branches which radiate from a nucleus formed by the polyfunctional coupling agent.

Such a method of preparation is described in detail in Zelinski et al, U.S. Pat. No. 3,281,383, which is incorporated herein by reference.

The coupling agents for the radial teleblock copolymers can be chosen from among polyepoxides, polyisocyanates, polyimines, polyaldehydes, polyketones, polyanhydrides, polyesters, polyhalides and the like. These materials can contain two or more types of functional groups, such as the combination of epoxy and aldehyde groups or isocyanate and halide groups. The coupling agents are described in detail in the above-mentioned U.S. Pat. No. 3,281,383.

The conjugated dienes of the radial teleblock copolymer include compounds such as 1,3-butadiene, isoprene, 2,3-dimethyl-1,3-butadiene, 1,3-pentadiene, 3-butyl-1,3-octadiene, and the like. The vinyl aromatic polymers may be prepared from vinyl aromatic compounds of Formula II. They include styrene, 1-vinylnaphthalene, 2-vinylnaphthalene and the alkyl, cycloalkyl, aryl, alkaryl and aralkyl derivatives thereof. Examples include 3-methylstyrene, 4-n-propylstyrene, 4-cyclohexylstyrene, 4-4-(4-phenyl-n-butyl) styrene, and the like.

In preferred compositions, the radial teleblock copolymer will be a radial teleblock copolymer of styrene and butadiene, with terminal blocks derived from styrene, and a coupling agent selected from epoxidized polybutadiene, $SiCl_4$ or mixtures thereof. Especially preferred epoxidized polybutadiene coupling agents are available commercially under the trade names Oxiron 2000 and Oxiron 2001.

The molecular weight of the radial teleblock copolymer and the ratios of the co-monomers thereof can vary broadly. In preferred embodiments the molecular weight of the radial teleblock copolymer will be from about 100,000 to about 350,000, and will comprise from 1 to 45 parts by weight of the vinyl aromatic compound and from 99 to 55 parts by weight of the conjugated diene, based on the weight of the radial teleblock copolymer. The amount of coupling agent in the copolymer will depend on the particular agent and the amount of organometallic initiator used. Generally, relatively small amounts of coupling agent, e.g., from about 0.1 to 1 part by weight per 100 parts of resin are employed.

Preferred radial teleblock copolymers are Solprene 406 (containing about 60 parts by weight of butadiene units and about 40 parts by weight of styrene units), Solprene 411 (containing about 70 parts by weight of butadiene units and about 30 parts by weight of styrene units), Solprene 414 (containing about 60 parts by weight of butadiene units and about 40 parts by weight of styrene units), and S411P (containing about 70 parts by weight of butadiene units and about 30 parts by weight of styrene units). These materials also include a relatively minor amount of coupling agent, e.g., less than 1 part by weight of coupling agent per 100 parts of polymer.

As noted above, the compositions of this invention can also include a polyphenylene ether resin. The polyphenylene ether resins are preferably of the formula:

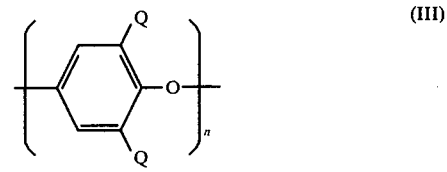

(III)

wherein the oxygen ether atom of one unit is connected to the benzene nucleus of the next adjoining unit, n is a positive integer and is at least 50 and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Examples of polyphenylene ethers corresponding to the above formula can be found in Hay, U.S. Pat. Nos. 3,306,874 and 3,306,875 and in Stamatoff, U.S. Pat. Nos. 3,257,357 and 3,257,358, which are incorporated herein by reference.

For purposes of the present invention, an especially preferred family of polyphenylene ethers includes those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like. The most preferred polyphenylene ether resin is poly(2,6-dimethyl-1,4-phenylene)ether, preferably having an intrinsic viscosity of about 0.5 deciliters per gram as measured in chloroform at 25° C.

The components of the compositions of this invention are combinable in a wide range of proportions. The compositions can comprise, for instance, from about 5 to about 95, preferably from about 40 to about 90 parts by weight of (i) the copolymer of a vinyl aromatic compound and an $\alpha,\beta$-unsaturated cyclic anhydride, and from about 95 to about 5, preferably from about 60 to about 10, parts by weight of (ii) the radial teleblock copolymer.

When a polyphenylene ether resin is also used, the compositions will preferably include from about 5 to about 95, preferably from about 40 to about 90 parts by weight of the copolymers of a vinyl aromatic compound and an $\alpha,\beta$-unsaturated cyclic anhydride, from about 95 to about 5, preferably from about 60 to about 10 parts by weight of the radial teleblock copolymer, and preferably from about 1 to about 75 parts by weight of a polyphenylene ether resin.

The compositions of the invention can also include other ingredients, such as flame retardants, extenders, processing aids, pigments, stabilizers and the like, for their conventionally employed purposes. Reinforcing fillers, in amounts sufficient to impart reinforcement, can be used, such as aluminum, iron or nickel, and the like, and non-metals, such as carbon filaments, silicates, such as acicular calcium silicate, asbestos, titanium dioxide, potassium titanate and titanate whiskers, glass flakes and fibers.

The preferred reinforcing fillers are of glass. In general, best properties will be obtained if glass filaments are employed in amounts of from about 10 to about 40% by weight, based on the combined weight of glass and resin. However, higher amounts can be used.

The compositions of the invention may be prepared by blending the components in a Henschel mixer and compounding the mixture on a twin-screw 28 mm Werner-Pfleiderer extruder. Thereafter, the extrudate is chopped into pellets and molded on a Newbury injection molding machine.

The present invention is further illustrated in the following examples, which are not to be construed as limiting. All parts are by weight.

EXAMPLES 1–6

Blends of styrene-maleic anhydride copolymer, styrene-butadiene radial teleblock copolymer and poly(2,6-dimethyl-1,4-phenylene)ether resin were prepared by blending the components in a Henschel mixer and thereafter compounding the mixture on a twin-screw 28 mm Werner-Pfleiderer extruder. Thereafter the extrudate was chopped into pellets and molded on a Newbury injection molding machine. The compositions are shown below:

| Components | 1 | 2 | 3 | 4 | 5 | 6 |
|---|---|---|---|---|---|---|
| Styrene-maleic anhydride copolymer[a] | 100 | 70 | 60 | — | — | — |
| Rubber-modified styrene-maleic anhydride copolymer[b] | — | — | — | 100 | 80 | 70 |
| Styrene-butadiene radial teleblock copolymer[c] | — | 30 | 30 | — | — | — |
| Styrene-butadiene radial teleblock copolymer[d] | — | — | — | — | 20 | 20 |
| Poly(2,6-dimethyl-1,4-phenylene) ether[e] | — | — | 10 | — | — | 10 |

[a] Dylark 232, Arco Polymers
[b] Dylark 240, Arco Polymers
[c] Solprene 406, Philips Petroleum Co.
[d] Solprene 414, Phillips Petroleum Co.
[e] PPO, General Electric Co., having an I.V. of about 0.5 as measured in $CHCl_3$ at 25° C.

The above compositions were molded into test bars and tested according to ASTM procedures to evaluate physical properties.

The results are reported in Table 1.

Table 1

| Property | 1 | 2 | 3 | 4 | 5 | 6 |
|---|---|---|---|---|---|---|
| Tensile yield (psi) | 9300 | 5600 | 5500 | 7800 | 5700 | 5900 |
| Tensile strength (psi) | 9300 | 4800 | 4800 | 6400 | 4900 | 5300 |
| Elongation (%) | 9 | 46 | 34 | 31 | 48 | 38 |
| Izod Imp. Strength (ft. lb./in.n) | 0.43 | 3.0 | 3.7 | 1.8 | 1.7 | 3.4 |
| Gardner Imp. Strength (in.-lbs.) | <10 | 103 | 73 | <10 | 10 | 30 |

The test results show elongation and impact strength are improved by the addition of the radial teleblock copolymer to a styrene-maleic anhydride resin. The presence of the polyphenylene ether resin further enhances the improvement in impact strength.

Obviously, other modifications and variations of the present invention are possible in the light of the above teachings. For instance, the compositions may contain other functional additives, e.g., plasticizers, extenders, lubricants, oxidation inhibitors, flame retardants, pigments, stabilizers, and the like.

It is, therefore, to be understood that changes may be made in the particular embodiments described above, which are within the full intended scope of the invention as defined in the appended claims.

What is claimed is:

1. A thermoplastic molding composition which consists essentially of, in intimate admixture:
    (i) a copolymer of a vinyl aromatic compound and an $\alpha,\beta$-unsaturated cyclic anhydride, and
    (ii) a radial teleblock copolymer of a vinyl aromatic compound, a conjugated diene, and a coupling agent.

2. A composition as defined in claim 1 wherein said vinyl aromatic compound of component (i) is derived from the formula:

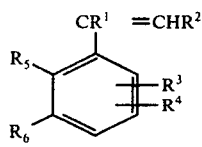

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to about 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom; and wherein said $\alpha,\beta$-unsaturated cyclic anhydride of component (i) is represented by the formula:

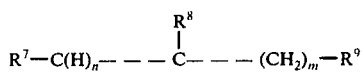

wherein the dotted lines represent a single or a double carbon to carbon bond, $R^7$ and $R^8$ taken together represents a

linkage, $R^9$ is selected from the group consisting of hydrogen, vinyl, alkyl, alkenyl, alkylcarboxylic or alkenylcarboxylic of from 1 to 12 carbon atoms, $n$ is 1 or 2, depending on the position of the carbon-carbon double bond, and m is an integer of from 0 to about 10.

3. A composition as defined in claim 1 wherein said thermoplastic composition includes from about 5 to about 95% by weight of said copolymer (i) of a vinyl aromatic compound of an $\alpha,\beta$-unsaturated cyclic anhydride, and from 95 to 5 parts by weight of said radial teleblock copolymer (ii) of a vinyl aromatic compound, a conjugated diene and a coupling agent.

4. A composition as defined in claim 3 wherein said thermoplastic composition includes from about 40 to about 90 parts by weight of said copolymer (i) of a vinyl aromatic compound and an $\alpha,\beta$-unsaturated cyclic anhydride, and from about 60 to about 10 parts by weight of said radial teleblock copolymer (ii) of a vinyl aromatic compound, a conjugated diene and a coupling agent.

5. A composition as defined in claim 1 wherein component (i) is a rubber-modified copolymer of a vinyl aromatic compound and an $\alpha,\beta$-unsaturated cyclic anhydride.

6. A composition as defined in claim 1 wherein component (i) comprises from 40 to 1 parts by weight of an $\alpha,\beta$-unsaturated cyclic anhydride and from 60 to 99 parts by weight of a vinyl aromatic compound, and from 0 to 25 parts by weight of rubber.

7. A composition as defined in claim 1 wherein said radial teleblock copolymer (ii) comprises from 1 to 45 parts by weight of the vinyl aromatic compound and from 99 to 55 parts by weight of the conjugated diene and a relatively small amount of coupling agent, based on the weight of the radial teleblock copolymer.

8. A composition as defined in claim 7 wherein, in said radial teleblock copolymer (ii), the coupling agent is a polymer selected from the group consisting of polyepoxides, polyisocyanates, polyimines, polyaldehydes, polyketones, polyanhydrides, polyesters, and polyhalides.

9. A composition as defined in claim 1 wherein, in said radial teleblock copolymer (ii), the vinyl aromatic compound is styrene, the conjugated diene is butadiene, and the coupling agent is selected from the group consisting of epoxidized polybutadiene, $SiCl_4$ and mixtures thereof.

10. A composition as defined in claim 1 which includes a reinforcing amount of a reinforcing filler.

11. A thermoplastic molding composition which comprises an intimate admixture of:
    (i) from about 40 to about 90 parts by weight of a copolymer of styrene and maleic anhydride, and
    (ii) from about 60 to about 10 parts by weight of a radial teleblock copolymer of styrene, butadiene, and an epoxidized polybutadiene coupling agent.

12. A composition as defined in claim 11 wherein component (i) is a diene rubber-modified copolymer of styrene and maleic anhydride.

13. A composition as defined in claim 11 which further comprises a glass reinforcing filler in an amount of from about 10 to about 40%, based on the combined weight of glass and resin.

* * * * *